3,252,950
2-STAGE POLYMERIZATION PROCESS FOR METHYL METHACRYLATE
Joseph F. Terenzi, South Norwalk, and Joseph M. Schmitt, Ridgefield, Conn., assignors to American Cyanamid Company, Stamford, Conn., a corporation of Maine
Filed May 17, 1962, Ser. No. 195,576
16 Claims. (Cl. 260—80.5)

This invention relates to a novel process for the continuous solution polymerization of methacrylic acid esters. More particularly, this invention relates to a novel process for the continuous solution polymerization of methacrylic acid esters, especially methyl methacrylate, utilizing various inert organic solvents boiling from within the range of from about 100° C. to about 140° C. Still more particularly, this invention relates to a novel process for the continuous solution polymerization of methyl methacrylate wherein at least two stages of polymerization are employed and wherein conversions of from about 90% to 100% are achieved.

The polymerization of methacrylic acid esters has been known for many years, however, continuous processes for the polymerization of these compounds have been relatively few and far between. Generally, the polymerization of, for example, methyl methacrylate, on a commercial scale, has been carried out batchwise or by aqueous emulsion, bulk, casting or granular polymerization processes. These processes, however, are not readily adaptable for continuous operation. Bulk casting methods are cumbersome and relatively expensive while granular polymerization and emulsion polymerization processes necessitate the use of a multiplicity of extraneous materials, i.e. water, emulsifying or granulating agents and the like. Additionally, bulk methods are undesirable since run-away reactions may occur and therefore, control over the polymerization is extremely difficult. Batch type aqueous suspension processes, on the other hand, while most commonly utilized in industry, are not conducive to continuous operation and are therefore rather expensive. The relatively high processing costs for the polymerization of the methacrylic acid esters, due to the fact that other methods are not suited to being rendered continuous, have continually plagued the polymer industry in the production of poly(methacrylic acid esters). To the best of our knowledge no continuous process, except for our novel process disclosed herein, has been known for the production of e.g. poly(methyl methacrylate), at from about 90% to about 100% conversion.

Although some continuous solution polymerization processes have been developed in the past, these processes have not been able to be run to at least 90% conversion, and additionally, have been very difficult to control in regard to the desired molecular weight of the polymer product and in regard to the polymerization reaction per se.

We have found that our novel process obviates many of the aforementioned deficiencies in regard to the prior art bulk, emulsion, batch and granular polymerization processes and, in addition, is far superior in respect to conversion and control than the existing continuous methods. We have discovered a continuous polymerization process for the production of poly(methacrylic acid esters) wherein recovery and treatment of solvent is economical and easily conducted. Additionally, the properties, e.g. molecular weights, of the polymers are easily controlled by the effective adjusting of the concentration of chain transfer agent, catalyst or reaction temperature etc., while the process per se in regard to run-away reactions, is also controlled, thereby minimizing the risk of equipment losses. Our process is generally conducted at atmospheric pressures whereas most known continuous processes stress the necessity of high pressure reactions and apparatus. Lower temperatures of reaction are now possible utilizing the solvents disclosed herein and polymeric products having less than 0.5% monomer, or other non-polymeric material, can be recovered. Our process enables us to add reactive catalysts, modifiers and other materials to the solvent in plant storage and may also be employed to produce impact polymers by adding other materials during the first stage of the reaction. Additionally, the product effluent recovered from the tower stage of the reaction may be continuously diluted for direct application in laquers.

It is an object of the present invention to present a novel continuous process for the solution polymerization of methacrylic acid esters.

It is a further object of the present invention to present a novel process for the continuous solution polymerization of e.g. methyl methacrylate, utilizing various inert solvents boiling within the range of from about 100° C. to about 140° C.

It is still a further object of the present invention to present a novel process for the continuous solution polymerization of e.g. methyl methacrylate, wherein at least two polymerization stages are employed and wherein conversions of from about 90% to 100% are achieved.

According to our novel continuous polymerization process, polymers of methacrylic acid esters are produced by adding monomeric ester, initiator and chain length regulator to a solvent, boiling within the range of from about 100° C. to 140° C., and heating the solution to a temperature of from about 70° C. to 107° C. in a first polymerization zone until sufficient polymerization occurs to form thereby a solution of a certain predetermined conversion and certain predetermined percent polymer solids. The partially polymerized reaction media is then subjected to further and complete polymerization in a final polymerization zone wherein no mixing of the incoming media with the media at the bottom of the zone occurs and wherein a temperature gradient of from about the boiling point of the volatiles at the top and preferably at about the boiling point of the solvent at the bottom is maintained. A polymeric solution is withdrawn from said final polymerization at about 90% to 100% conversion and is subsequently treated to remove the volatile materials.

Although any methacrylic acid ester may be treated by our novel process, in order to more clearly set out our process, the following discussion will be directed solely to the process as applied to the polymerization of methyl methacrylate. This however, is not to be construed as a limitation on the feed materials which may be polymerized by our process.

More specifically, our novel process comprises continually polymerizing methyl methacrylate, to preferably 100% conversion, in a series of at least three zones, at least two of which are polymerization stages.

Primarily, the first polymerization zone comprises a so-called pre-body zone wherein a solution of methyl methacrylate, initiator, chain length regulator and solvent, e.g. xylene, are admixed in amounts ranging from 10% to 40%, by weight, preferably 25% to 35%, of solvent and 90% to 60%, by weight, prefeerably 65% to 75% of methyl methacrylate. Comonomers copolymerizable with methacrylic acid esters, may also be employed in amounts such that the solution contains at least 35%, preferably 60%, by weight, of methacrylic acid ester.

From about .01% to 5.0%, preferably 0.1% to 3.0%, by weight, based on the weight of monomer, of a polymerization initiator is present in the solution. Any known free-radical generating polymerization initiator may be employed, with such initiators as tertiary butyl perbenzoate, dicumyl peroxide, 2,5-dimethyl 2,5-di(tert.-butylperoxy) n-hexane being preferred. The particular initiator employed depends substantially upon the rate of conversion which is desired and practical in the operation of the process. Generally about 5% to 10% conversion per hour is practical and satisfactory in the first and second polymerization zones. However, it must also be noted that the half-life of the initiator should be such that rapid dissipation occurs in the last polymerization zone of the process. Generally, initiators which have half-lives of about 100 hours at the first and second polymerization zone temperatures have been found to be preferred since they are most practical.

Examples of other initiators which may also be used are benzoyl peroxide, lauroyl peroxide, azobisisobutyronitrile, 2,5-dimethyl-2,5-di(t-butylperoxy) hexane, the dialkyl peroxides, e.g. diethyl peroxide, dipropyl peroxide, dilauryl peroxide, dioleyl peroxide, distearyl peroxide, di-(tertiary-butyl) peroxide and di-(tertiary-amyl) peroxide, such peroxides often being designated as ethyl, propyl, lauryl, oleyl, stearyl, tertiary-butyl and tertiary-amyl peroxides; the alkyl hydrogen peroxides, e.g. tertiary-butyl hydrogen peroxide (tertiary-butyl hydroperoxide), tertiary-amyl hydrogen peroxide (tertiary-amyl hydroperoxide), etc.; symmetrical diacyl peroxides, for instance, peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide and the like.

Other examples of organic peroxide initiators which may be employed are the following: tetralin hydroperoxide, cumene hydroperoxide, tertiary-butyl perbenzoate and the like.

A chain length regulator must also be utilized in our process in order to enable effective control of the molecular weight of the polymeric methyl methacrylate being produced. Generally, amounts ranging from about 0.2% to about 1.0%, by weight, based on the weight of monomer, are employed with the lowest amounts enabling the production of the polymers with the highest molecular weights. Examples of regulators which may be used, the selection of said regulator being governed by the temperature of reaction, i.e. the regulator must possess a boiling point above said reaction temperature, include the organic sulfur compounds, i.e. the thio acids, mercaptans, such as benzyl mercaptan, aliphatic mercaptans possessing at least 6 carbon atoms, such as octyl, n-dodecyl and t-dodecyl mercaptan, mixtures of mercaptans such as are obtained from lauryl alcohol, nitrohydroazine, etc., amino compounds, or any other well known polymerization modifier or regulator which possesses the qualifications expressed above.

The temperature in the first polymerization zone is maintained between about 70° C. and 107° C., with 95° C. to 105° C. being preferred, for from about 3 to 10 hours, i.e. until a polymer solids content of between 10% to 35%, by weight, preferably 15% to 25%, and a percent conversion of between 15% to 50%, preferably 20% to 40%, is attained.

During the polymerization in the first stage, the reaction media is continually agitated. That is to say, the reaction is conducted in a fully turbulent agitation state such as that defined in Badger & Bancheros, "Introduction to Chemical Engineering," page 614, McGraw-Hill Publishers (1955). In this manner the desired degree of conversion may be effected since the agitation assists in the dissipation of the exothermic heat given off during the reaction. The agitation in the first zone must be continuously employed during the entire reaction and must be such that agitation of the reaction media can be continued at the aforesaid maximum percentages of conversion and solids content.

Although generally one reaction stage is employed in the first polymerization zone, it is permissible to use two, three, etc. or more stages, if desired, if a polymer is being produced which has such a viscosity in each stage, that a different means of agitation is necessary in order to continue effective dispersion of the viscous polymeric media during the polymerization thereof to the optimum solids content.

The inert, organic solvent employed in the process must possess a boiling point of between about 100° C. and about 140° C. Examples of solvents which may be used are the alkyl aromatic hydrocarbons, e.g. toluene, xylene, etc.; esters, such as amyl acetate; chlorinated paraffins and aromatics; ketones, e.g. 2-methyl-pentanone-4; Cellosolve and the like. Generally, any inert solvent for the charge having a boiling point within the above range may be employed with those most economically available and causing the least deleterious effect to the polymer, i.e. xylene, toluene, etc., being preferred. Higher boiling solvents are undesirable since they present numerous difficulties in regard to their subsequent removal and recovery from the product polymer. One further desired property of the solvent that is to be employed is that it be such that the viscosity of the final polymeric solution, at the temperature at the bottom of the third polymerization zone, is low enough to allow practical withdrawal of the polymeric solution from the final polymerization zone at the high solids level mentioned hereinbefore.

Since the viscosity of the reaction media at the end of the polymerization in the first polymerization zone is such that agitation tends to become difficult in the equipment employed, the reaction media may be further polymerized by transferring said media to a second polymerization zone wherein more efficient agitation of the media may be effected. From this time on during the conversion of the methyl methacrylate, the danger of poor process and product control becomes increasingly apparent.

It is preferred therefore, in our novel process, to introduce the polymer media from the first polymer zone into a "thermascrew-type" polymerization zone which constitutes the second polymerization zone of our novel process and which may consist of one, two, three or more stages in the same manner as disclosed above in regard to the first zone. In the second zone of polymerization, the reaction is carried out to about a 34% to 78%, preferably 40% to 68%, conversion and a polymer solids content of from about 24% to 60%, by weight, preferably 35% to 50%. The second polymerization zone consists of a suitable apparatus capable of handling highly viscous materials, such as a Rietz Thermascrew, a Crawford and Russell high viscosity reactor etc. or any other apparatus capable of handling and agitating solutions having a viscosity of at least 100,000 cps. It is preferred that the temperature of the continued polymerization in the second polymerization zone be the same as that maintained in the pre-body or first polymerization zone, however, small variations of temperature, i.e. up to one or two degrees, in the second polymerization zone are tolerable and do not materially effect the results of our novel process. The main difference between the two zones is the degree and type of agitation conducted in each. The agitation is more intense in the thermascrew zone or second polymerization zone than in the first polymerization zone, as indicated by the discussion of the type of apparatus employed therein.

Upon removal of the reaction media from the second polymerization zone, it is then transferred to the final, and most important, polymerization zone of our process. It is this final polymerization zone which enables the production of methacrylic acid ester polymers at more than 90% conversion, and even up to 100% conversion. The final zone consists of a vertical plug flow vessel which is partitioned off into individual, interconnected zones capable of being heated individually to a specific temperature. By "plug flow vessel" is meant a vessel wherein substantially no mixing of the incoming reaction media occurs with the reaction media at the bottom of the vessel. That is to say there is no back flow of material, thereby causing material which is more completely polymerized to come into contact with that material which is less completely polymerized. The incoming reaction media, which is pre-polymerized in the first two polymerization zones, is allowed to flow slowly downwardly through the final polymerization zone, without coming into contact with more completely polymerized monomer, and in this manner a percent conversion of at least 90% and a solids content of at least 60% is attained.

The temperature employed in the final polymerization zone is such that a boiling pool of reaction media is maintained on the surface of the contents of this zone. This boiling pool removes heat from the zone which occurs due to the exothermic polymerization of remaining unreacted monomer. Since substantially no agitation is conducted in the final zone, heat cannot be removed in the normal manner, i.e. through wall or coil surfaces. The boiling pool solves this problem. The zone is heated at the bottom to a temperature such that the highly converted, highly viscous polymeric solution of high polymer solids content is maintained flowable. That is to say, depending upon the viscosity of the polymer solution, the percent conversion obtained and the polymer solids content, the polymer solution is heated to the temperature at the bottom of the zone which will enable the product solution to remain flowable. Generally, this temperature is about the boiling point of the solvent, i.e. 5–10° C. below or above the solvent boiling point. However, in some instances lower or higher temperatures may be necessary. Of course, when higher temperatures are used a slight pressure must be applied to the zone. A temperature gradient then develops in the zone and the top of the zone is thereafter maintained at a temperature of at least about 100° C., i.e. at about the boiling point of the volatiles. In other words, preferably, the temperature of the reaction media in the bottom of the final polymerization zone is maintained at about the boiling point of the solvent while that at the top of the final polymerization zone is generally equal to or somewhat higher than, that of the first two polymerization zones. No boiling of the reaction media occurs at the bottom of the zone since the polymerization is substantially complete while the pool at the top of the zone boils because unreacted monomer is present in this area and polymerization is incomplete. The boiling pool at the top of the zone will cause the vaporation of unreacted monomer, if any, and solvent. The vaporized material is recovered, condensed and allowed to flow back into the final zone by means of a condenser positioned on top of the zone.

Only very slight agitation is tolerable in the final polymerization zone. Generally, scraper blades to keep the walls clean and a short screw at the very bottom to aid in solution removal, is sufficient. In this manner, no breaking down of the polymer or back flow occurs and each portion of the polymerizing media is, as such, allowed to flow in an essentially unrestricted manner through the whole length of the zone to substantially complete conversion. Agitation of from about 2 to 60 revolutions per hour of a scraper or blade type stirrer generally may be employed without causing degradation or backflow, the number of revolutions used depending, of course, on the diameter of the tower used, i.e. the larger the diameter, the fewer the revolutions per hour.

By conducting the final polymerization zone at the boiling point of the solvent, a substantially complete conversion of monomer to polymer can be accomplished and only by the use of such a solvent at such a temperature can the completely converted highly viscous polymer be removed from the zone. The unique combination of the disclosed critical solvents and the absence of agitation combine to allow the production, removal and transfer of the high solids, viscous, polymer solution of at least 90% conversion.

The time of reaction in the tower is generally from about 3 to 20 hours, preferably 8 to 15 hours and the viscosity of the polymer which is recovered at more than 90% conversion is generally not less than 500,000 cps.

As the polymeric product is recovered from the final polymerization zone, it is introduced into the last zone of our novel process comprising a devolatilizer-extruder which is sectionally heated at temperatures from about 110° C. to about 225° C. and is maintained under vacuum at an absolute pressure of from about 5 mm. to 200 mm. of mercury. Upon introducing the polymerized material into the devolatilizer-extruder, the increased temperature and heat supplied externally and the working of the polymer by the twin screws therein causes a volatilization of the solvent and the very small amount of unreacted monomer which may be present in the polymer. By this operation, the purity of the product polymer is carried up to about 99.5% and even higher. The solvent and traces of monomer which are recovered from the devolatilizer-extruder may then be recycled to the pre-body or first zone of our process. When the final product is only 90% converted, of course, more monomer recycle will be effected than if there is 100% conversion during the process.

In the devolatilizer-extruder, the reaction media is worked in a chamber under heat and vacuum so that new surfaces of the polymer are continuously and rapidly exposed to vacuum to remove the monomeric material and solvent before extruding the product. The term "devolatilization" as herein employed refers to the step in which the nonpolymeric material is removed from the polymer solution. The apparatus which simultaneously devolatilizes and extrudes the material is of a commercially available design and comprises a chamber with one or more screws having a close tolerance with the wall, and with one another in a multi-screw machine, for compounding the material in its passage therethrough, and at least one vacuum chamber for removing the volatile components of the feed. The action of working the material under the close tolerance of the screws not only intimately blends the mixture, but generates substantial heat which aids in the devolatilization of the blend.

The devolatilizer-extruder may contain one or more interconnected sections, at least one being under vacuum. A preferred treatment wherein the material is worked for a total time of from about 1 to 5 minutes, employs two vacuum sections. In addition to the vacuum sections, the devolatilizer-extruder may contain a section following the vacuum sections which is atmospheric, i.e. not under vacuum, wherein various volatiles or nonvolatile modifiers, plasticizers, or colorants, may be incorporated into the composition and extruded therewith.

The vacuum sections of the devolatilizer-extruder are heated from temperatures of from about 110° C. to 245° C. and maintained under vacuum at an absolute pressure of from about 5 mm. to about 200 mm. mercury. Preferably, the temperature of the sectionally heated apparatus is maintained at from about 160° C. to about 210° C. and the vacuum is preferably maintained at from about 5 mm. to 90 mm. mercury absolute pressure. As the polymer solution is introduced into the devolatilizer-extruder, the increased temperature causes volatilization of the nonpolymer therefrom. At the same time, because the extruder is maintained at subatmospheric pressures, the other volatile material is withdrawn or volatilized from the polymer-containing material.

The methacrylic acid esters which may be polymerized, alone or in combination with other ethylenically unsaturated monomers polymerizable therewith, have the formula (I)

wherein R represents an alkyl radical having from 1 to 6 carbon atoms, inclusive. Compounds which are represented by this formula include methyl methacrylate, ethyl methacrylate, propyl methacrylate, isopropyl methacrylate, n-butyl methacrylate, isobutyl methacrylate, t-butyl methacrylate, amyl methacrylate, hexyl methacrylate and the like. Additionally, mixtures of these methacrylic acid esters with each other, in combinations of two or more may, be also employed in our novel process.

Examples of monomers which can be copolymerized with the methacrylate monomers represented by Formula I, in admixture with the methacrylates containing at least 35% of the methacrylate, and which can be copolymerized either singly or in a plurality (two, three, four or any desired number), the latter often being desirable in order to improve the compatability and copolymerization characteristics of the mixture of monomers and to obtain copolymers having the particular properties desired for the particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated aliphatic and aromatic monobasic and polybasic acids such for instance, as acetic, propionic, butyric, valeric, caproic, crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes, such, for example, as the various di-, tri-, and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyl dibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, ethyl methallyl ether, etc.; unsaturated amides, for instance, N-allyl caprolactam, acrylamide, and N-substituted acrylamides, e.g., N-methylol acrylamide, N-allyl acrylamide, N-methy acrylamide, N-phenyl acrylamide, etc.; unsaturated ketones, e.g., methyl vinyl ketone, methyl allyl ketone, etc.; methylene malonic esters, e.g., methylene methyl malonate, etc.; ethylene; unsaturated polyhydric alcohol (e.g., butenediol, etc.) esters of saturated and unsaturated, aliphatic and aromatic, monobasic and polybasic acids.

Other examples of monomers that can be copolymerized with the methacrylate monomers of Formula I are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride and vinylidene iodide, other comonomers being added if needed in order to improve the compatibility and copolymerization characteristics of the mixed monomers.

More specific examples of allyl compounds that can be copolymerized with the compounds of Formula I are allyl alcohol, methallyl alcohol, diallyl carbonate, alyll lactate, allyl alphahydroxyisobutyrate, allyl trichlorosilane, diallyl methylgluconate, diallyl tartronate, dialyl tartrate, the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl citrate, triallyl phosphate, tetrallyl silane, tetrallyl silicate, hexallyl disiloxane, etc. Other examples of allyl compounds that may be employed are given, for example, in U.S. Patent No. 2,510,503, issued June 6, 1950.

Among the comonomers which are preferred for use in carrying our invention into effect are, for example, compounds such as acrylonitrile, and other compounds, e.g., the various substituted acrylonitriles (e.g., methacrylonitrile, ethacrylonitrile, phenylacrylonitrile, etc.) the acrylates, such as ethyl acrylate and the various monovinyl aromatic hydrocarbons, for instance, styrene, o-, m-, and p-methyl, chloro, ethyl, etc. styrenes, Other monomers copolymerizable with the monomers of Formula I are given, for instance, in United States Patent No. 2,601,572, dated June 24, 1952, where examples are given both by classes and species.

Of course, as above enumerated, it is also possible to produce copolymers produced from two or more of the monomers represented by Formula I, above, and still obtain the benefits heretofore set forth.

In order to more particularly understand the present invention, reference is made to the accompanying drawing illustrating our novel polymerization process. The figure represents our process with such features as minor pumps, valves, and meters etc. being omitted for purposes of simplicity. For purposes of illustration only, methyl methacrylate and xylene will be used for practicality and brevity during the following discussion of the drawing, although it is to be understood that solvent systems and other methacrylic acid esters or mixtures thereof with each other or with other copolymerizable monomers may be used.

Figure 1:
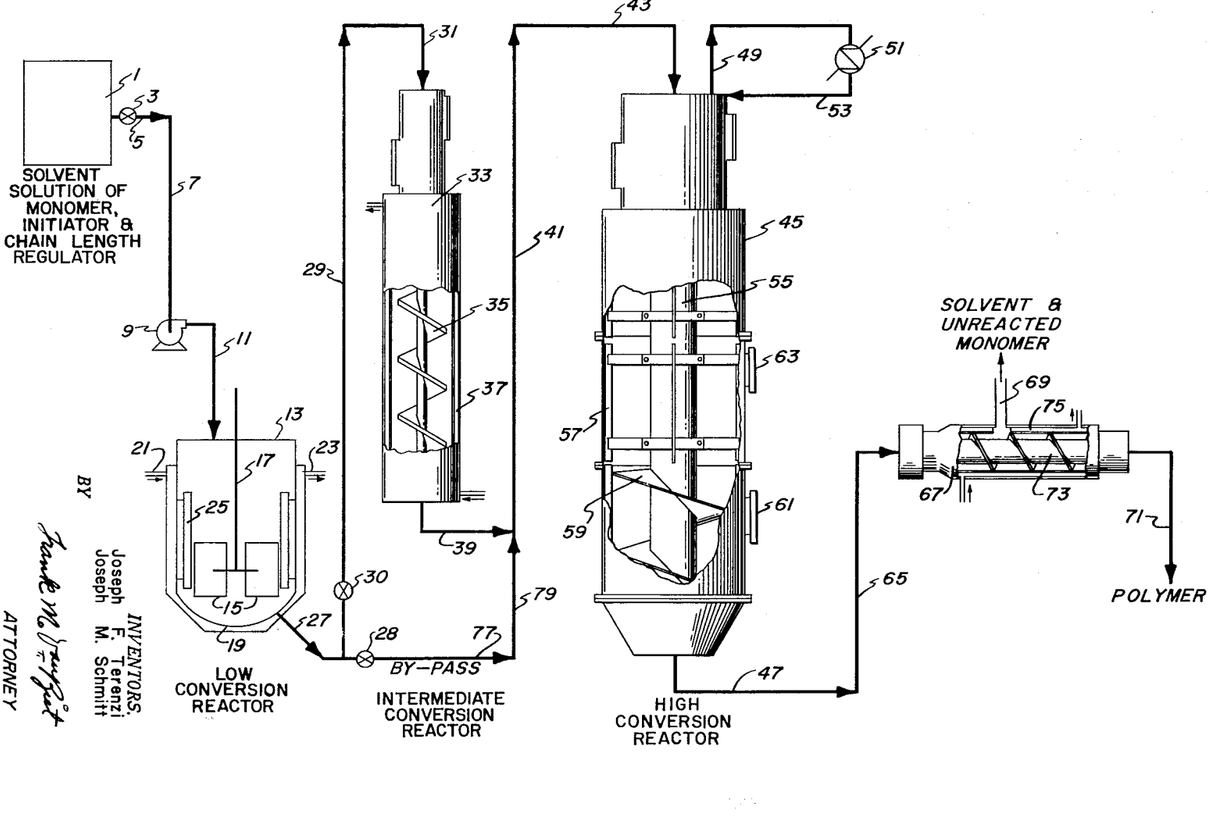

Methyl methacrylate and xylene, in solution, (70/30), by weight, respectively, dodecyl mercaptan and t-butyl perbenzoate are withdrawn from tank 1 by means of valve, 3, line 5 and line 7 and the mixture is pumped by pump 9 and line 11 into the first polymerization zone comprising pre-body reactor 13 which comprises paddle stirrers 15 on rod 17 and a cooling jacket 19 having inlet 21 and outlet 23 for passing fluid therethrough. The vessel preferably may contain baffles 25 which increase the facility of the agitation of the reaction media. After a conversion of at least 15% and not more than 50%, and a polymer solids content of between 10% and 35%, is reached, the reaction media is removed via line 27 and is passed via lines 29 and 31 into a thermascrew reactor 33, comprising the second polymerization zone. In this instance, valve 28 will be closed and valve 30 will be open. Reactor 33 is equipped with a hollow flight thermascrew 35 which has the facility of enabling the circulation of heating or cooling fluid therethrough. The thermascrew may preferably be equipped with a reverse flight, not shown, in order to insure controlled mixing therein. Further heating or cooling may be effected by passing additional fluid of the appropriate temperature through jacket 37. The monomer is allowed to polymerize in the second polymerization zone until a maximum conversion of not more than 78% and a maximum polymer solids content of not more than 60% is achieved and then the media is withdrawn via line 39 and transferred through conduits 41 and 43 into tower reactor 45, comprising the third and last polymerization zone. The polymer media is allowed to flow slowly downwardly through tower 45 while continually undergoing further polymerization, until it is withdrawn via line 47 as a substantially converted polymer. Solvent and monomer vapor is withdrawn via line 49 and is passed through condenser 51 in order to liquidize said vapor. The liquid solution is then allowed to flow back into the vessel via line 53. The tower has therein a shaft 55 extending the length thereof to which is attached wall scraping means 57. At the end of the rod is positioned a screw 59 which enables a more complete removal of polymer product to be recovered. Sight glasses 61 and 63 are positioned in the side of the tower so that the polymer being formed may be checked at all times. Since the polymerization of the polymer is complete when it reaches screw 59, the agitation produced by said screw is not sufficient to degrade the polymer or effect the polymerization going on in the top sections of tower 45.

The polymer removed from tower 45 via line 47 is passed via line 65 into devolatilizer-extruder 67 wherein the volatile material is vaporized and removed through conduit 69. The volatiles may be recycled back to prebody reactor 13 in a manner not shown and the final polymeric methyl methacrylate is recovered via line 71. The devolatilizer-extruder 67 has therein screw 73 and cooling and heating units 75 which knead and control the temperature of the polymer in order to remove undesirable components therefrom.

As can be seen, it is possible to by-pass thermascrew reactor 33 and transfer the first stage polymerization media directly to the third polymerization stage by passing said media through lines 27, 77, 79, 41 and 43. To completely by-pass zone 33, valve 30 will then be closed and valve 28 will be open. Generally, such a procedure is followed when the viscosity, polymer solids content and percent conversion of the polymer removed from the first polymerization stage is at a maximum. In this manner, a highly satisfactory product is also recovered. However, the use of the second polymerization (thermascrew) zone allows more flexibility in control of the process and product properties and preferably is always employed in the process.

It can be seen therefore that polymers of methacrylate acid esters may be produced utilizing our process having all of the desired properties necessary for subsequent use in various applications and at the high conversion achieved by treatment according to our process.

The polymers produced according to our process generally have weight average molecular weights in the range of from about 50,000 to 300,000 and are useful for application generally desired for commercial methacrylic acid ester polymers. The weight average molecular weights of the polymers are determined by the light scattering method; P. J. Flory, Principles of Polymer Chemistry, Cornell University Press, 1953, pp. 266–316.

There may be added to the polymerized acrylate, after the polymerization, such ingredients as light stabilizers, heat stabilizers, antioxidants, lubricants, plasticizers, pigments, fillers, dyes and the like, without detracting from the unique properties of our novel molding compositions.

The polymers formed according to the process of the present invention, in powdered form, may be used in the manufacture of automotive parts, such as tail-light and stop-light lenses, dials, instrument panels, and signal lights. Additionally, molded polymers may be used for control knobs, handles on all types of home appliances, pen and pencil barrels, hair brush backs, juke box panels and other large section moldings. The extrudates of the powdered polymers may be used to produce sheets for such applications as partitions and shower enclosures. Additionally, since the polymer products are transparent, very tough, light weight and somewhat pliable, they find usage in the medical field such as for medical examination instruments and orthopedic devices. They may also be used in the preparation of dentures. The polymers have also been used for the embedment of normal and pathological tissues for preservation and instructional use, as sales aids in the embedment of industrial machine parts and to prepare various home decorative articles.

The following examples are set forth for purposes of illustration only and are not to be construed as limitations on the instant invention. All parts and percentages are by weight unless otherwise indicated.

*Example 1*

A mixture of 70 parts of methyl methacrylate, dissolved in 30 parts of xylene, 0.28 part of dicumyl peroxide and 0.28 part of dodecyl mercaptan is charged to a five gallon turbine-agitated reactor. The temperature is slowly increased to 100° C., at which time about one gallon/hour of the same composition is continuously charged. The reactor contents are allowed to overflow through an overflow nozzle. The temperautre is held at 100° C. and after 18 hours, a steady state is achieved and the overflow reaches 35% polymer solids, as determined by a methanol precipitation of the polymer from a sample of the overflow, followed by filtering, drying and weighing of the polymer.

The overflow from the first zone is then fed directly into the top of a plug flow zone which is about 10 gallons in volume and 8 inches in internal diameter. Top and bottom sight glasses allow visual examination of the reactor contents at the ten and five gallon level, respectively. The speed of the scraper-agitator in the tower is set at three revolutions per hour and hot oil (100° C.) is applied to the bottom section thereof. When the level reaches the top sight glass (about 10 hours) the temperature of the bottom jacket oil is gradually increased to 140° C. Hot oil (100° C.) is then applied to the stop section of the tower. At the steady state, the temperature, as measured two inches below the boiling surface, is 117° C. When no hot oil is applied to the top section, this temperature measures 108° C. In either case polymer solution is continuously fed into the top of this zone and withdrawn from the bottom at a rate of about one gallon/hour. The effluent from the bottom measures 69% solids, or about 98% conversion.

The converted polymer solution is collected and continuously fed into a 2-inch devolatilizer-extruder. Vacuum is set at 25 mm. Hg in one zone and hot oil temperature of from 100° C. to 210° C. are maintained at the discharge end of the machine. The polymer is discharged from this last stage as viscous strands, about ⅛" in diameter and is cooled in a water bath and cut into ¼" lengths.

The polymer has an intrinsic viscosity in benzene of 0.31. Residual methyl methacrylate, as measured by titration of unsaturation, is 0.30%. Residual xylene, determined by vapor-phase chromatography, is 0.16%. Free mercaptan and residual peroxide (by VPC) measures less than 5 p.p.m. The operation is conducted in the manner described above for 56 hours producing about 300 pounds of moldable poly(methyl methacrylate). The molecular weight of the polymer is 85,000.

*Example 2*

A mixture of 67 parts of methyl methacrylate and 3 parts of ethyl acrylate, dissolved in 30 parts of xylene, 0.09 part 2,5-dimethyl 2,5-di-(tertiary butylperoxy) hexane and .03 part of dodecyl mercaptan is charged to a five gallon turbine-agitated reactor. The same procedure is followed as in Example 1. After 13 hours, the solids level in the overflow from the first zone is 16%.

The overflow from this zone is fed into a five gallon thermascrew reactor which is initially charged with the same mixture given above. The temperature is held at 98° C. and the screw agitator is set at 70 r.p.m. After a running time of about 20 hours, the solids level in the effluent from this zone reaches an essentially steady value of 38% solids.

The effluent from this second polymerization zone is fed into a third polymerization zone comprising a plug flow tower in a manner similar to that described in Example 1. The polymer solution continuously withdrawn from the bottom of the plug flow reactor measures 68.5% solids or a conversion of 98%.

The polymer solution from the plug flow zone is fed continuously, by means of a wide-mouthed, slow speed, gear pump located at the bottom of the reactor, to a devolatilizer-extruder. The polymer is discharged from this last stage as a viscous strand and is cooled and chopped as in Example 1. Average product rate is about 6 lbs./hr.

The polymer has an intrinsic viscosity of 0.36 in benzene. Total residuals were less than 0.70%. Other properties of molded specimens are Flexural Strength and Modulus: 16,500 p.s.i. and 0.48×10⁶ p.s.i. respectively; Heat distortion under Load: 91° C.; Izod impact strength: 0.25 ft.-lbs. per inch of notch. The molecular weight of the polymer recovered is 82,000.

This operation is conducted in the continuous fashion described above for about four days during which time over 1000 pounds of product is obtained.

*Example 3*

A mixture of 70 parts of methyl methacrylate dissolved in 30 parts of toluene, 0.09 part of 2,5-dimethyl 2,5-di-tertiary butylperoxy hexane and 0.245 part of dodecyl mercaptan is charged to the pre-body, thermascrew and tower reactors as in Example 2, respectively. 0.70 part of stearyl alcohol and 0.35 part of methyl salicylate are also added as a flow promoter and ultraviolet light absorber. Dodecyl mercaptan addition is lowered to 0.35 part later during the operation in order to adjust the molecular weight of the polymer to a lower level.

The run is conducted in a manner similar to that described in Example 2. The percent solids at the steady state were 20%, 33% and 69%, in the first, second and bottom of the third polymerization zones, respectively. The temperatures in the first and second zones were 101° C. and 99° C., respectively. In the plug flow zone, temperatures were 102° C. at the top and 115° C. at the bottom. Hot oil at 115° C. is applied to the bottom section, instead of 140° C. as in Example 1. The product has a molecular weight of about 130,000 at the beginning of the run and 100,000 after the mercaptan adjustment as determined from correlation with intrinsic viscosity, over the course of the run. Total residuals are less than 0.50%. Physical properties are Tensile Strength: 9,500 p.s.i.; Izod Impact strength: 0.24 ft.-lbs. per inch of notch; Heat Distortion Temperature under Load: 91° C. and Rockwell Hardness (M) 100±2.

The operation is run continuously for a period of 3 days and over 400 pounds of product are obtained.

*Example 4*

A mixture of 70 parts of methyl methacrylate, 15 parts of styrene and 15 parts of acrylonitrile, dissolved in 30 parts of xylene, are charged to a five gallon turbine-agitated reactor along with 0.09 part of 2,5-dimethyl 2,5-di-tertiary butylperoxy hexane and 0.14 part of dodecyl mercaptan. The temperature is slowly increased to 98° C. and about one gallon of the same feed is then fed to the reactor per hour. The reactor contents are then allowed to overflow through an overflow valve. The temperature is held at 98° C. and after about 5 hours a steady state is achieved and the overflow reaches 15% solids, determined as in Example 1.

The overflow from the first polymerization zone is then passed to a second polymerization zone comprising a five gallon thermascrew reactor. The temperature therein is maintained at 98° C. and the screw agitator speed is set at 65 r.p.m. After 6 hours the solids level in the effluent reaches a steady value of 34% solids.

The effluent is then transferred to a third polymerization zone comprising a plug flow tower (as described in Example 1). The stirrer speed is set to 2 RPH and the bottom section of the tower is heated to 120° C., with a hot oil. After about 6 hours, hot oil is applied to the top of the tower, thereby heating said top section to 108° C. Polymer solution from the second polymerization zone is continually fed to the tower at the rate of one gallon per hour. A slight ammonia flow is added to the vapor space at the top of the tower in order to prevent vapor phase polymerization of the monomeric acrylonitrile. The polymer product withdrawn from the bottom of the tower at the end of 12 hours has a solids content of 68% solids or about 98.5% conversion.

The polymer product is continually fed to a devolatilizer-extruder as described in Example 1. The polymer is withdrawn therefrom as viscous strands which are solidified in a cold water bath. This operation is continuously conducted for 60 hours producing in the period 100 pounds of moldable product.

Physical properties are molecular weight: 75,000; Flexural Strength: 17,000 p.s.i.; Tensile strength: 9,700 p.s.i.; Rockwell Hardness (M): 100 and Izod Impact Strength: 0.28 ft.-lbs. per inch of notch.

Example 4 shows the flexibility of the process in that the temperature maintained at the bottom of the third polymerization zone is lower than the boiling point of the solvent, xylene. Since the polymeric product is still flowable at 120° C., this temperature may therefore be used instead of the solvent boiling point.

We claim:

1. In a process for the continuous polymerization of a methacrylic acid ester having the formula wherein R is an alkyl group having 1 to 6 carbon atoms, inclusive, wherein the ester, containing from about 10% to about 40%, by weight, of an inert organic solvent having a boiling point of from about 100° C. to about 140° C., is continuously charged to a first polymerization zone and is partially polymerized therein to a percent conversion of from about 15% to about 78%, in the presence of from about .01% to about 5%, by weight, of a free-radical polymerization initiator and from about 0.2% to about 1.0%, by weight, of a chain-length regulator, each based on the weight of methacrylic acid ester, the partially polymerized reaction mixture is transferred to a final polymerization zone, the resultant methacrylic acid ester polymer is removed to a third zone heated to a temperature of from about 110° C. to about 245° C. and under vacuum to thereby remove substantially all of the volatile components in said polymer and the resultant polymer so produced is recovered, the improvement wherein a temperature gradient of from about the boiling point of the volatiles at the top of said final polymerization zone to a temperature sufficient to maintain the final polymeric solution flowable at that temperature at the bottom of said final polymerization zone is maintained and said reaction media is allowed to flow slowly downwardly through said final polymerization zone in the substantial absence of externally applied agitation until the percent conversion of said methacrylic acid ester is at least 90%.

2. A process for the continuous polymerization of a methacrylic acid ester having the formula wherein R is an alkyl radical having 1 to 6 carbon atoms, inclusive, comprising (1) continuously charging to a first polymerization zone, at a temperature of from about 70° C. to about 107° C., and with continuous agitation, a solution of said methacrylic acid ester, an inert organic solvent for said ester, said solvent having a boiling point of from about 100° C. to about 140° C., a free-radical polymerization initiator and a chain length regulator, said solution containing from about 10% to about 40%, by weight, of said solvent, from about .01% to about 5.0%, by weight, of said initiator and from about 0.2% to about 1.0%, by weight, of said chain length regulator, each based on the weight of methacrylic acid ester, continuing the polymerization until the reaction media contains from about 10% to about 35% polymer solids, (2)

transferring said reaction media to a final polymerization zone wherein a temperature gradient of from about the boiling point of the volatiles at the top of said final zone to a temperature sufficient to maintain the final polymeric solution flowable at that temperature at the bottom of said final zone is maintained, allowing said reaction media to flow slowly downwardly through said final polymerization zone in the substantial absence of externally applied agitation until the percent conversion of said methacrylic acid ester is at least 90%, (3) continuously removing the highly converted methacrylic acid ester polymer to a third zone heated to a temperature of from about 110° C. to about 245° C. and under vacuum to thereby remove substantially all of the volatile components in said polymer and recovering the polymer of methacrylic acid ester so produced.

3. A process for the continuous polymerization of a methacrylic acid ester having the formula wherein R is an alkyl radical having 1 to 6 carbon atoms, inclusive, comprising (1) continuously charging to a first polymerization zone, at a temperature of from about 70° C. to about 107° C., and with continuous agitation, a solution of said methacrylic acid ester, and inert organic solvent for said ester, said solvent having a boiling point of from about 100° C. to about 140° C., a free-radical polymerization initiator and a chain length regulator, said solution containing from about 10% to about 40%, by weight, of said solvent, from about .01% to about 5.0%, by weight, of said initiator and from about 0.2% to about 1.0%, by weight, of said chain length regulator, each being based on the weight of said methacrylic acid ester, continuing the polymerization until the reaction media contains from about 10% to about 35%, by weight, of polymer solids, (2) transferring said reaction media to a second polymerization zone with continuous agitation and at substantially the same temperature as maintained in said first polymerization zone, continuing said polymerization in said second polymerization zone until the reaction media contains from about 24% to about 60%, by weight, of polymer solids, (3) transferring said reaction media to a final polymerization zone wherein a temperature gradient of from about the boiling point of said solvent at the bottom of said final zone to at least the boiling point of the volatiles at the top of said final zone is maintained, allowing said reaction media to flow slowly downwardly through said final polymerization zone in the substantial absence of externally applied agitation until the percent conversion of said methacrylic acid ester is at least 90%, (4) continuously removing the highly converted methacrylic acid ester polymer to a fourth zone heated to a temperature of from 110° C. to about 245° C. and under vacuum to thereby remove substantially all of said volatile components in said polymer, and recovering the polymer of methacrylic acid ester so produced.

4. A process for the continuous polymerization of methyl methacrylate comprising (1) continuously charging to a first polymerization zone, at a temperature of from about 70° C. to about 107° C., and with continuous agitation, a solution of said methyl methacrylate, an inert organic solvent for said methyl methacrylate, said solvent having a boiling point of from about 100° C. to about 140° C., a free-radical polymerization initiator and a chain length regulator, said solution containing from about 10% to about 40%, by weight, of said solvent, from about .01% to about 5.0%, by weight, of said initiator and from about 0.2% to about 0.1%, by weight, of said chain length regulator, each based on the weight of methyl methacrylate, continuing the polymerization until the reaction media contains from about 10% to about 35% polymer solids, (2) transferring said reaction media to a final polymerization zone wherein a temperature gradient of from about the boiling point of the solvent at the bottom of said final zone to at least the boiling point of the volatiles at the top of said final zone is maintained, allowing said reaction media to flow slowly downwardly through said final polymerization zone in the substantial absence of externally applied agitation until the percent conversion of said methyl methacrylate is at least 90%, (3) continuously removing the highly converted methyl methacrylate polymer to a third zone heated to a temperature of from about 110° C. to about 245° C. and under vacuum to thereby remove substantially all of the volatile components in said polymer and recovering the poly(methyl methacrylate) so produced.

5. A process for the continuous polymerization of methyl methacrylate comprising (1) continuously charging to a first polymerization zone, at a temperature of from about 70° C. to about 107° C., and with continuous agitation, a xylene solution of said methyl methacrylate, a free-radical polymerization initiator and a chain length regulator, said xylene solution containing from about 10% to about 40%, by weight, of said xylene, from about .01% to about 5.0%, by weight, of said initiator and from about .02% to about 1.0%, by weight, of said chain length regulator, each based on the weight of methyl methacrylate, continuing the polymerization until the reaction media contains from about 10% to about 35% polymer solids, (2) transferring said reaction media to a final polymerization zone wherein a temperature gradient of from about the boiling point of the solvent at the bottom of said final zone to at least the boiling point of the volatiles at the top of said final zone is maintained, allowing said reaction media to flow slowly downwardly through said final polymerization zone in the substantial absence of externally applied agitation until the percent conversion of said methyl methacrylate is at least 90%, (3) continuuously removing the highly converted methyl methacrylate polymer to a third zone heated to a temperature of from about 110° C. to about 245° C. and under vacuum to thereby remove substantially all of the volatile components in said polymer and recovering the poly(methyl methacrylate) so produced.

6. A process for the continuous polymerization of methyl methacrylate comprising (1) continuously charging to a first polymerization zone, at a temperature of from about 70° C. to about 107° C., and with continuous agitation, a solution of said methyl methacrylate, an inert organic solvent for said ester, said solvent having a boiling point of from about 100° C. to about 140° C., a free-radical polymerization initiator and a chain length regulator, said solution containing from about 10% to about 40%, by weight, of said solvent, from about .01% to about 5.0%, by weight, of said initiator and from about 0.2% to about 1.0%, by weight, of said chain length regulator, each being based on the weight of said methyl methacrylate, continuing the polymerization until the reaction media contains from about 10% to about 35%, by weight, of polymer solids, (2) transferring said reaction media to a second polymerization zone with continuous agitation and at substantially the same temperature as maintained in said first polymerization zone, continuing said polymerization in said second polymerization zone until the reaction media contains from about 24% to about 60%, by weight, of polymer solids, (3) transferring said reaction media to a final polymerization zone wherein a temperature gradient of from about the boiling point of said solvent at the bottom of said final zone to at least the boiling point of the volatiles at the top of said final zone is maintained, allowing said reaction media to flow slowly downwardly through said final polymerization zone in the substantial absence of externally applied agitation until the percent conversion of said methyl methacrylate is at least 90%, (4) continuously removing the highly converted methyl metharcylate polymer to a fourth zone heated to a temperature of from 110° C. to about 245° C., and under vacuum to thereby remove substantially all of said volatile components in said polymer, and recovering the poly(methyl metharcylate) so produced.

7. A process for the continuous polymerization of methyl methacrylate comprising (1) continuously charging to a first polymerization zone, at a temperature of from about 70° C. to about 107° C., and with continuous agitation, a xylene solution of said methyl methacrylate, a free-radical polymerization initiator and a chain length regulator, said xylene solution containing from about 10% to about 40%, by weight, of said xylene, from about .01% to about 5.0%, by weight, of said initiator and from about 0.2% to about 1.0%, by weight, of said chain length regulator, each being based on the weight of said methyl methacrylate, continuing the polymerization until the reaction media contains from about 10% to about 35%, by weight, of polymer solids, (2) transferring said reaction media to a second polymerization zone with continuous agitation and at substantially the same temperature as maintained in said first polymerization zone, continuing said polymerization in said second polymerization zone until the reaction media contains from about 24% to about 60%, by weight, of polymer solids, (3) transferring said reaction media to a final polymerization zone wherein a temperature gradient of from about the boiling point of said xylene at the bottom of said final zone to at least the boiling point of the volatiles at the top of said final zone is maintained, allowing said reaction media to flow slowly downwardly through said final polymerization zone in the substantial absence of externally applied agitation until the percent conversion of said methyl methacrylate is at least 90%, (4) continuously removing the highly converted methyl methacrylate polymer to a fourth zone heated to a temperature of from 110° C. to about 245° C. and under vacuum to thereby remove substantially all of said volatile components in said polymer, and recovering the poly(methyl methacrylate) so produced.

8. A process for the continuous polymerization of methyl methacrylate comprising (1) continuously charging to a first polymerization zone, at a temperature of from about 70° C. to about 107° C., and with continuous agitation, a toluene solution of said methyl methacrylate, a free-radical polymerization initiator and a chain length regulator, said toluene solution containing from about 10% to about 40%, by weight, of said toluene, from about .01% to about 5.0%, by weight, of said initiator and from about 0.2% to about 1.0%, by weight, of said chain length regulator, each based on the weight of methyl methacrylate, continuing the polymerization until the reaction media contains from about 10% to about 35% polymer solids, (2) transferring said reaction media to a final polymerization zone wherein a temperature gradient of from about the boiling point of the solvent at the bottom of said final zone to at least the boiling point of the volatiles at the top of said final zone is maintained, allowing said reaction media to flow slowly downwardly through said final polymerization zone in the substantial absence of externally applied agitation until the percent conversion of said methyl methacrylate is at least 90%, (3) continuously removing the highly converted methyl methacrylate polymer to a third zone heated to a temperature of from about 110° C. to about 245° C. and under vacuum to thereby remove substantially all of the volatile components in said polymer and recovering the poly(methyl methacrylate) so produced.

9. A process for the continuous polymerization of methyl methacrylate comprising (1) continuously charging to a first polymerization zone, at a temperature of from about 70° C. to about 107° C., and with continuous agitation, a toluene solution of said methyl methacrylate, a free-radical polymerization initiator and a chain length regulator, said toluene solution containing from about 10% to about 40%, by weight, of said toluene, from about .01% to about 5.0%, by weight, of said initiator and from about 0.2% to about 1.0%, by weight, of said chain length regulator, each being based on the weight of said methyl methacrylate, continuing the polymerization until the reaction media contains from about 10% to about 35%, by weight, of polymer solids, (2) transferring said reaction media to a second polymerization zone with continuous agitation and at substantially the same temperature as maintained in said first polymerization zone, continuing said polymerization in said second polymerization zone until the reaction media contains from about 24% to about 60%, by weight, of polymer solids, (3) transferring said reaction media to a final polymerization zone wherein a temperature gradient of from about the boiling point of said toluene at the bottom of said final zone to at least the boiling point of the volatiles at the top of said final zone is maintained, allowing said reaction media to flow slowly downwardly through said final polymerization zone in the substantial absence of externally applied agitation until the percent conversion of said methyl methacrylate is at least 90%, (4) continuously removing the highly converted methyl methacrylate to a fourth zone heated to a temperature of from 110° C. to about 245° C. and under vacuum to thereby remove substantially all of said volatile components in said polymer, and recovering the poly(methyl methacrylate) so produced.

10. A process for the continuous polymerization of methyl methacrylate comprising (1) continuously charging to a first polymerization zone, at a temperature of from about 70° C. to about 107° C., and with continuous agitation, a xylene solution of said methyl methacrylate, 2,5-dimethyl 2,5-di-(tertiary butylperoxy) hexane and dodecyl mercaptan, said xylene solution containing from about 10% to about 40%, by weight, of said xylene, from about .01% to about 5.0%, by weight, of said 2,5-dimethyl 2,5-di(tertiary butylperoxy)hexane and from about 0.2% to about 1.0%, by weight, of said dodecyl mercaptan, each based on the weight of methyl methacrylate, continuing the polymerization until the reaction media contains from about 10% to about 35% polymer solids, (2) transferring said reaction media to a final polymerization zone wherein a temperature gradient of from about the boiling point of the solvent at the bottom of said final zone to at least the boiling point of the volatiles at the top of said final zone is maintained, allowing said reaction media to flow slowly downwardly through said final polymerization zone in the substantial absence of externally applied agitation until the percent conversion of said methyl methacrylate is at least 90%, (3) continuously removing the highly converted methyl methacrylate polymer to a third zone heated to a temperature of from about 110° C. to about 245° C. and under vacuum to thereby remove substantially all of the volatile components in said polymer and recovering the poly(methyl methacrylate) so produced.

11. A process for the continuous polymerization of methyl methacrylate comprising (1) continuously charging to a first polymerization zone, at a temperature of from about 70° C. to about 107° C., and with continuous agitation, a xylene solution of said methyl methacrylate, 2,5-dimethyl 2,5-di-(tertiary butylperoxy) hexane and dodecyl mercaptan, said xylene solution containing from about 10% to about 40%, by weight, of said xylene, from about .01% to about 5.0%, by weight, of said 2,5-dimethyl 2,5-di-(tertiary butylperoxy) hexane and from about 0.2% to about 1.0%, by weight, of said dodecyl mercaptan, each being based on the weight of said methyl methacrylate, continuing the polymerization until the reaction media contains from about 10% to about 35%, by weight, of polymer solids, (2) transferring said reaction media to a second polymerization zone with continuous agitation and at substantially the same temperature as maintained in said first polymerization zone, continuing said polymerization in said second polymerization zone until the reaction media contains from about 24% to about 60%, by weight, of polymer solids, (3) trans- ferring said reaction media to a final polymerization zone wherein a temperature gradient of from about the boiling point of said xylene at the bottom of said final zone to at least the boiling point of the volatiles at the top of said final zone is maintained, allowing said reaction media to flow slowly downwardly through said final polymerization zone in the substantial absence of externally applied agitation until the percent conversion of said methyl methacrylate is at least 90%, (4) continuously removing the highly converted methyl methacrylate polymer to a fourth zone heated to a temperature of from 110° C. to about 245° C. and under vacuum to thereby remove substantially all of said volatile components in said polymer, and recovering the poly(methyl methacrylate) so produced.

12. A process for the continuous polymerization of a monomeric mixture comprising at least 35%, by weight, of a methacrylic acid ester having the formula wherein R is an alkyl radical having 1 to 6 carbon atoms, inclusive, the remaining of said mixture being at least one comonomer copolymerizable with said ester comprising (1) continuously charging to a first polymerization zone, at a temperature of from about 95° C. to about 105° C., and with continuous agitation, a solution of said monomeric mixture, an inert organic solvent for said monomeric mixture, said solvent having a boiling point of from about 100° C. to about 140° C., a free-radical polymerization initiator and a chain length regulator, said solution containing from about 25% to about 35%, by weight, of said solvent, from about 0.1% to about 3.0%, by weight, of said initiator and from about 0.2% to about 1.0%, by weight, of said chain length regulator, each based on the weight of said monomeric mixture, continuing the polymerization until the reaction media contains from about 15% to about 25% polymer solids, (2) transferring said reaction media to a final polymerization zone wherein a temperature gradient of from about the boiling point of the solvent at the bottom of said final zone to at least the boiling point of the volatiles at the top of said final zone is maintained, allowing said reaction media to flow slowly downwardly through said final polymerization zone in the substantial absence of externally applied agitation until the percent conversion of said monomeric mixture is at least 95%, (3) continuously removing the highly converted polymer to a third zone heated to a temperature of from about 110° C. to about 245° C. and under vacuum to thereby remove substantially all of the volatile components in said polymer and recovering the polymer so produced.

13. A process for the continuous polymerization of a monomeric mixture comprising at least 35%, by weight, of a methacrylic acid ester having the formula wherein R is an alkyl radical having 1 to 6 carbon atoms, inclusive, the remaining of said mixture being at least one comonomer copolymerizable with said ester comprising (1) continuously charging to a first polymerization zone, at a temperature of from about 95° C. to about 105° C., and with continuous agitation, a solution of said monomeric mixture, an inert organic solvent for said monomeric mixture, said solvent having a boiling point of from about 100° C. to about 140° C., a free-radical polymerization initiator and a chain length regulator, said solution containing from about 25%, to about 35%, by weight, of said solvent, from about 0.1% to about 3.0%, by weight, of said initiator and from about 0.2% to about 1.0%, by weight, of said chain length regulator, each being based on the weight of said monomeric mixture, continuing the polymerization until the reaction media contains from about 15% to about 25%, by weight, of polymer solids, (2) transferring said reaction media to a second polymerization zone with continuous agitation and at substantially the same temperature as maintained in said first polymerization zone, continuing said polymerization in said second polymerization zone until the reaction media contains from about 35% to about 50%, by weight, of polymer solids, (3) transferring said reaction media to a final polymerization zone wherein a temperature gradient of from about the boiling point of said solvent at the bottom of said final zone to at least the boiling point of the volatiles at the top of said final zone is maintained, allowing said reaction media to flow slowly downwardly through said final polymerization zone in the substantial absence of externally applied agitation until the percent conversion of said monomeric mixture is at least 95%, (4) continuously removing the highly converted polymer to a fourth zone heated to a temperature of from 110° C. to about 245° C. and under vacuum to thereby remove substantially all of said volatile components in said polymer, and recovering the polymer so produced.

14. A process for the continuous polymerization of methyl methacrylate comprising (1) continuously charging to a first polymerization zone, at a temperature of from about 95° C. to about 105° C., and with continuous agitation, a solution of said methyl methacrylate, an inert organic solvent for said methyl methacrylate, said solvent having a boiling point of from about 100° C. to about 140° C. a free-radical polymerization initiator and a chain length regulator, said solution containing from about 25% to about 35%, by weight, of said solvent, from about 0.1% to about 3.0%, by weight, of said initiator and from about 0.2% to about 1.0%, by weight, of said chain length regulator, each based on the weight of methyl methacrylate, continuing the polymerization until the reaction media contains from about 15% to about 25% polymer solids, (2) transferring said reaction media to a final polymerization zone wherein a temperature gradient of from about the boiling point of the solvent at the bottom of said final zone to at least the boiling point of the volatiles at the top of said final zone is maintained, allowing said reaction media to flow slowly downwardly through said final polymerization zone in the substantial absence of externally applied agitation until the percent conversion of said methyl methacrylate is at least 95%, (3) continuously removing the highly converted methyl methacrylate polymer to a third zone heated to a temperature of from about 110° C. to about 245° C. and under vacuum to thereby remove substantially all of the volatile components in said polymer and recovering the poly(methyl methacrylate) so produced.

15. A process for the continuous polymerization of methyl methacrylate comprising (1) continuously charging to a first polymerization zone, at a temperature of from about 95° C. to about 105° C., and with continuous agitation, a solution of said methyl methacrylate, an inert organic solvent for said ester, said solvent having a boiling point of from about 100° C. to about 140° C., a free-radical polymerization initiator and a chain length regulator, said solution containing from about 25% to about 35%, by weight, of said solvent, from about 0.1% to about 3.0%, by weight, of said initiator and from about 0.2% to about 1.0%, by weight, of said chain length regulator, each being based on the weight of said methacrylic acid ester, continuing the polymerization until the reaction media contains from about 15% to about 25%, by weight, of polymer solids, (2) transferring said reaction media to a second polymerization zone with continuous agitation and at substantially the same temperature as maintained in said first polymerization zone, continuing said polymerization in said second polymerization zone until the reaction media contains from about 35% to about 50%, by weight, of polymer solids, (3) transferring said reaction media to a final polymerization zone wherein a temperature gradient of from about the boiling point of said solvent at the bottom of said final zone to at least the boiling point of the volatiles at the top of said final zone is maintained, allowing said reaction media to flow slowly downwardly through said final polymerization zone in the substantial absence of externally applied agitation until the percent conversion of said methyl methacrylate is at least 95%, (4) continuously removing the highly converted methyl methacrylate polymer to a fourth zone heated to a temperature of from 110° C. to about 245 C.° and under vacuum to thereby remove substantially all of said volatile components in said polymer, and recovering the poly(methyl methacrylate) so produced.

16. A process for the continuous polymerization of a monomeric mixture containing at least 35%, by weight, of methyl methacrylate, not more than 35%, by weight, of acrylonitrile, and the remainder being styrene the total percentage of monomers being 100% comprising (1) continuously charging to a first polymerization zone, at a temperature of from about 95° C. to about 105° C., and with continuous agitation a xylene solution of said monomeric mixture, 2,5-dimethyl 2,5-di-(tertiary butylperoxy) hexane and dodecyl mercaptan, said xylene solution containing from about 25% to about 35%, by weight, of said xylene, from about 0.1% to about 3.0%, by weight, of said 2,5-dimethyl 2,5-di-(tertiary-butylperoxy) hexane and from about 0.2% to about 1.0%, by weight of said dodecyl mercaptan, each based on the weight of said monomeric mixture, continuing the polymerization until the reaction media contains from about 15% to about 25% polymer solids, (2) transferring said reaction media to a second polymerization zone with continuous agitation and at substantially the same temperature as maintained in said first polymerization zone, continuing said polymerization in said second polymerization zone until the reaction media contains from about 24% to about 60%, by weight, of polymer solids, (3) transferring said reaction media to a final polymerization zone wherein a temperature gradient of from about the boiling point of said xylene at the bottom of said final zone to at least the boiling point of the volatiles at the top of said final zone is maintained, allowing said reaction media to flow slowly downwardly through said final polymerization zone in the substantial absence of externally applied agitation until the percent conversion of said monomeric mixture is at least 95%, (4) continuously removing the highly converted polymer to a fourth zone heated to a temperature of from 110° C. to about 245° C. and under vacuum to thereby remove substantially all of said volatile components in said polymer, and recovering the polymer so produced.

References Cited by the Examiner

UNITED STATES PATENTS

| | | | |
|---|---|---|---|
| 2,530,409 | 11/1950 | Stober et al. | 260—95 |
| 2,769,804 | 11/1956 | Hanson | 260—95 |

FOREIGN PATENTS 683,329  11/1952  Great Britain.

JOSEPH L. SCHOFER, *Primary Examiner.*

JOSEPH R. LIBERMAN, *Examiner.*

H. WONG, *Assistant Examiner.*

UNITED STATES PATENT OFFICE
CERTIFICATE OF CORRECTION

Patent No. 3,252,950                                                          May 24, 1966

Joseph F. Terenzi et al.

It is hereby certified that error appears in the above numbered patent requiring correction and that the said Letters Patent should read as corrected below.

Column 4, line 75, the up-side down line should appear as shown below instead of as in the patent: -- reaction media at the bottom of the vessel. That is to say, --; column 9, line 30, for "methacrylate" read -- methacrylic --; column 13, line 70, for "0.1%" read -- 1.0% --.

Signed and sealed this 18th day of July 1967.

(SEAL)
Attest:

ERNEST W. SWIDER                                              EDWARD J. BRENNER
Attesting Officer                                                 Commissioner of Patents